(12) United States Patent
Sawai

(10) Patent No.: US 6,420,205 B1
(45) Date of Patent: Jul. 16, 2002

(54) METHOD FOR PRODUCING PACKAGE FOR HOUSING PHOTOSEMICONDUCTOR ELEMENT

(75) Inventor: Takashi Sawai, Shiga (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 09/535,288

(22) Filed: Mar. 24, 2000

(30) Foreign Application Priority Data

| Mar. 24, 1999 | (JP) | ............................................ 11-080519 |
| Mar. 24, 1999 | (JP) | ............................................ 11-080521 |
| Mar. 24, 1999 | (JP) | ............................................ 11-080522 |
| Mar. 24, 1999 | (JP) | ............................................ 11-080523 |
| Mar. 24, 1999 | (JP) | ............................................ 11-080524 |
| Mar. 24, 1999 | (JP) | ............................................ 11-080525 |

(51) Int. Cl.[7] .......................... H01L 21/00; G02B 6/26; G02B 6/36
(52) U.S. Cl. .......................... 438/65; 264/1.25; 385/91; 385/94
(58) Field of Search .............................. 438/64, 65, 25, 438/26; 264/1.25, 1.28; 385/91, 94, 107

(56) References Cited

U.S. PATENT DOCUMENTS

| 4,349,585 A | | 9/1982 | Nagashima et al. | |
| 4,465,742 A | | 8/1984 | Nagashima et al. | |
| 4,576,659 A | * | 3/1986 | Lewis et al. ................. | 148/127 |
| 5,194,295 A | * | 3/1993 | Iacovangelo .................. | 427/98 |
| RE34,484 E | | 12/1993 | Nagashima et al. | |
| 5,533,158 A | * | 7/1996 | Han et al. ..................... | 385/88 |
| 5,647,942 A | * | 7/1997 | Haji ............................. | 156/281 |
| 5,744,848 A | * | 4/1998 | Harazono ..................... | 257/433 |
| 5,970,194 A | * | 10/1999 | Dunn et al. ................... | 385/95 |
| 5,998,733 A | * | 12/1999 | Smith ........................ | 174/50.52 |
| 6,012,853 A | * | 1/2000 | Pan et al. ..................... | 385/88 |
| 6,036,375 A | * | 3/2000 | Yanagisawa et al. ......... | 385/94 |
| 6,088,501 A | * | 7/2000 | Delrosso ..................... | 385/134 |

FOREIGN PATENT DOCUMENTS

| JP | 54-146986 | 11/1979 |
| JP | 60-013078 | 4/1985 |
| JP | 61-042936 | 3/1986 |
| JP | 06-151629 | 5/1994 |
| JP | 08-241933 | 9/1996 |

* cited by examiner

Primary Examiner—John F. Niebling
Assistant Examiner—Viktor Simkovic
(74) Attorney, Agent, or Firm—Hogan & Hartson, L.L.P.

(57) ABSTRACT

An object of the present invention is to firmly attach a metallic fixing member to which an optical-fiber member is fixed, to a substrate.

A tubular metallic fixing member, to one end of which an optical-fiber member is connected, is brazed and attached to a substrate housing a photosemiconductor element by depositing a nickel plating layer and a gold plating layer in succession on the surface thereof, subjecting the metallic fixing member into which a light-transmitting member is attached via glass, to an etching treatment, and removing nickel oxide formed on the surface of the gold plating layer.

16 Claims, 10 Drawing Sheets

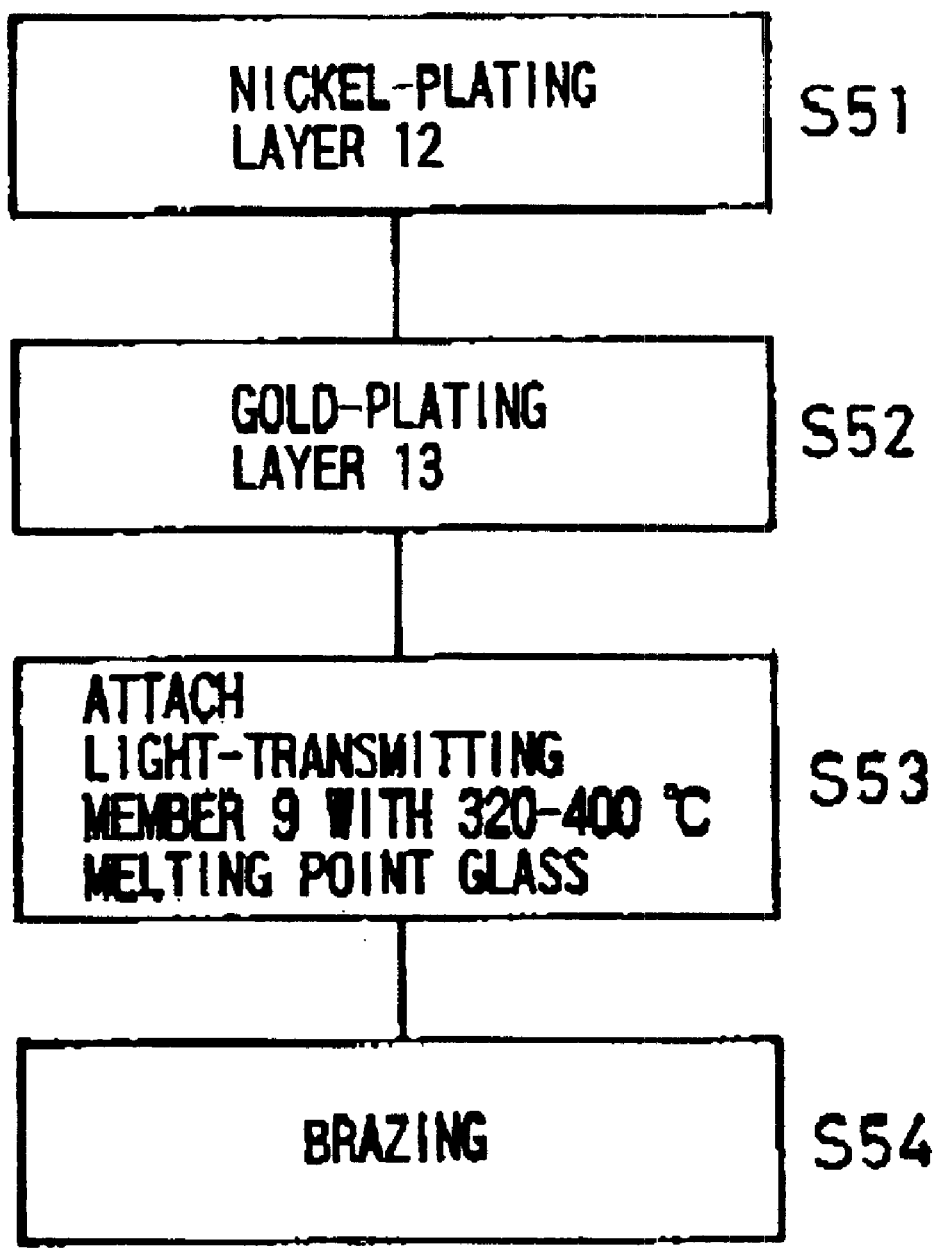

METHOD FOR PRODUCING PACKAGE FOR HOUSING PHOTOSEMICONDUCTOR ELEMENT

BACKGROUND OF THE INVENTION

1. Field of the Invention

The present invention relates to a package for housing a photosemiconductor element.

2. Description of the Related Art

A conventional package for housing a photosemiconductor element comprises: (a) a substrate made of a ceramics material such as sintered aluminum oxide in general, and having, on the top surface thereof, a recess for housing a photosemiconductor element; (b) a tubular fixing member attached by brazing to a through hole formed on a side of the substrate and the periphery of the substrate around the through hole, having therein a space for transmitting optical signals, and made of metallic material such as an iron-nickel alloy (iron: 50 wt %, nickel: 50 wt %); (c) a light-transmitting member attached to an inside of the tubular fixing member with glass to block the inside; (d) a plurality of wiring conductor layers which is made of tungsten, molybdenum, manganese or the like deposited and led out from the inside of the recess of the substrate to the periphery of the substrate, and to which electrodes of a photosemiconductor element are connected via electrically connecting means such as bonding wires; and (e) a lid attached to the top surface of the substrate to close the recess. A photosemiconductor device is completed as a product by adhering and fixing a photosemiconductor element into the recess of the substrate with an adhesion such as glass, a resin or a brazing material, while electrically connecting the individual electrodes of the photosemiconductor element to the wiring conductor layers via the electrically connecting means such as bonding wires, and thereafter joining he lid to the top surface of the substrate with a sealing material made of glass, a resin, a brazing material or the like to hermetically house the photosemiconductor element into a container composed of the substrate and the lid, while welding and connecting an optical-fiber member to the tubular fixing member by using laser light beams of YAG or the like.

Such a photosemiconductor device causes the photosemiconductor element to excite light in a predetermined manner on the basis of driving signals supplied from an external electric circuit, thereby causing the optical-fiber member to receive the excited light via the light-transmitting member and causing the optical-fiber member to transmit the excited light in a optical fiber thereof, so that the photosemiconductor device is used in high-speed communication and the like.

Further, in the package for housing a photosemiconductor element mentioned above, the tubular fixing member is brazed and attached to the substrate in the following way.

(1) At first, a nickel plating layer and a gold plating layer are deposited in succession on the surface of the tubular fixing member in order to braze and attach the tubular fixing member to the substrate reliably and firmly.

The nickel plating layer is an under member for firmly depositing the gold plating layer on the tubular fixing member, and is deposited on the periphery of the tubular fixing member to a thickness of approximately 0.5 $\mu$m to 5 $\mu$m by the electrolytic plating method or the electroless plating method.

Further, the gold plating layer has the function of enhancing the wettability of a brazing material to the tubular fixing member, and is deposited on the nickel plating layer to a thickness of approximately 1 $\mu$m to 3 $\mu$m by the electrolytic plating method or the electroless plating method.

(2) Next, the light-transmitting member is attached to an inside of the tubular fixing member with glass to block the inside.

The light-transmitting member is attached to the tubular fixing member by applying, for example, low-melting-point solder glass having a melting point lower than that of the light-transmitting member, to the inside of the tubular fixing member, placing the light-transmitting member on the coating low-melting-point solder glass, and thereafter heating them up to a temperature of approximately 450° C. in the air to melt the low-melting-point solder glass.

(3) Finally, the tubular fixing member is brazed and attached to the periphery of the substrate around the through hole with a low-melting-point brazing material comprising an gold-tin alloy or the like, whereby a package for housing a photosemiconductor element is completed as a product.

The tubular fixing member is brazed to the substrate by placing the tubular fixing member on the periphery of the substrate around the through hole so as to sandwich the low-melting-point brazing material made of a gold-tin alloy (gold: 80 wt %, tin: 20 wt %) or the like, and thereafter heating them up to a temperature of approximately 300° C. to melt the low-melting-point brazing material.

However, this conventional method for producing a package for housing a photosemiconductor element has a drawback of being incapable of firmly brazing and attaching the tubular fixing member to the substrate, because when the light-transmitting member is attached to the inside of the tubular fixing member with glass, part of the nickel plating layer deposited on the periphery of the tubular fixing member is, due to heat and atmosphere in glass attachment, diffused in the gold plating layer and exposed to the surface of the gold plating layer, which is oxidized to become a large amount of nickel oxide on the surface of the gold plating layer, with the result that the poor wettability of the nickel oxide to the brazing material largely decreases the joint strength of the brazing material to the tubular fixing member.

Then, in order to overcome the drawback described above, it may be considered to deposit the nickel plating layer and the gold plating layer in succession on the surface of the tubular fixing member after attaching the light-transmitting member to the inside of the tubular fixing member with glass.

However, this may induce another drawback. The glass attaching the light-transmitting member to the inside of the tubular fixing member is low-melting-point solder glass, and the low-melting-point solder glass has poor chemical resistance. Therefore, in the case of depositing the nickel plating layer and the gold plating layer on the surface of the tubular fixing member after attaching the light-transmitting member to the inside of the tubular fixing member with the glass, the glass is melted by a chemical of a plating solution, with the result that the light-transmitting member is detached from the tubular fixing member.

SUMMARY OF THE INVENTION

The present invention, which has been made in view of the drawbacks described above, is aimed at providing a method for producing a package for housing a photosemiconductor element made to have a considerably high reliability by firmly brazing and attaching a tubular fixing member to a substrate.

The invention provides a method for producing a package for housing a photosemiconductor element, the package for housing a photosemiconductor element comprising a substrate having a recess for housing the photosemiconductor element on a top surface of the substrate, a through hole being formed in a side of the substrate; a tubular metallic fixing member which is brazed to an outer surface of the substrate around the through hole, an optical fiber member being connected to one end of the tubular metallic fixing member; a light-transmitting member attached to an inside of the tubular metallic fixing member to block the inside; and a lid attached to the top surface of the substrate to close the recess, the method comprising:

(a) a first step of depositing a nickel plating layer on a surface of the tubular metallic fixing member and successively depositing a gold plating layer thereon without occurrence of diffusion of the nickel plating layer to the gold plating layer, and attaching the light-transmitting member to an inside of the metallic fixing member with glass without occurrence of damage to a surface of the light-transmitting member; and (b) a second step of brazing and attaching the metallic fixing member to the outer surface of the substrate around the through hole with a brazing material.

In the method for producing a package for housing a photosemiconductor element of the invention it is preferable that the first step comprises:

(a1) a step of depositing a nickel plating layer on a surface of the tubular metallic fixing member and successively depositing a gold plating layer thereon;

(b1) a step of attaching the light-transmitting member to an inside of the metallic fixing member with glass; and (c1) a step of removing part of a surface of the gold plating layer deposited on the nickel plating layer on the surface of the metallic fixing member, by an etching treatment.

According to the method for producing a package for housing a photosemiconductor element of the invention, after the light-transmitting member is attached to the metallic fixing member with glass, part of the surface of the gold plating layer deposited on the nickel plating layer on the surface of the metallic fixing member is removed by an etching treatment. Therefore, when a large amount of nickel oxide having a poor wettability to a brazing material is formed, due to diffusion and oxidation of the nickel plating layer serving as an under member, on the surface of the gold plating layer, the nickel oxide is removed by an etching treatment, with the result that the joint strength of the brazing material to the tubular metallic fixing member is largely enhanced, and the tubular metallic fixing member can be considerably firmly brazed and attached to the substrate.

In the method for producing a package for housing a photosemiconductor element of the invention it is preferable that a thickness d12 of the nickel plating layer is approximately 0.5 to 5 µm, a thickness d13 of the gold plating layer is approximately 3 to 8 µm, a thickness d23 of the part of the surface of the gold plating layer, subjected to the etching treatment is approximately 0.5–3 µm.

In the method for producing a package for housing a photosemiconductor element of the invention it is preferable that an etchant of the etching treatment comprises potassium cyanide, lead monoxide and chelating agent.

In the method for producing a package for housing a photosemiconductor element of the invention it is preferable that the first step comprises:

(a2) a step of depositing a nickel plating layer on a surface of the tubular metallic fixing member, and subjecting the nickel plating layer deposited on the surface of the tubular metallic fixing member, to a heat treatment in a reducing atmosphere;

(b2) a step of depositing a gold plating layer on the nickel plating layer; and (c2) a step of attaching the light-transmitting member to an inside of the metallic fixing member with glass.

According to the method for producing a package for housing a photosemiconductor element of the invention, the nickel plating layer deposited on the surface of the metallic fixing member is subjected to a heat treatment in a reducing atmosphere, and the nickel plating layer is printed on the metallic fixing member. Therefore, it would hardly occur that when the light-transmitting member is attached to the inside of the metallic fixing member with glass, part of the nickel plating layer deposited on the surface of the metallic fixing member is diffused in the gold plating layer due to heat and atmosphere in glass attachment and exposed to the surface of the gold plating layer, with the result that it would not happen that a large amount of nickel oxide is formed on the surface of the gold plating layer. Therefore, the wettability of the gold plating layer to the brazing material may become so excellent that the joint strength of the brazing material to the metallic fixing member is largely enhanced, whereby the metallic fixing member can be considerably firmly brazed and attached to the substrate.

In the method for producing a package for housing a photosemiconductor element of the invention it is preferable that the first step comprises:

(a3) a step of depositing a nickel plating layer comprising 1–65 wt % cobalt and 35–99 wt % nickel on a surface of the tubular metallic fixing member and successively depositing a gold plating layer thereon; and (b3) a step of attaching the light-transmitting member to an inside of the metallic fixing member with glass.

According to the method for producing a package for housing a photosemiconductor element of the invention, the nickel plating layer deposited on the surface of the metallic fixing member comprises 1–65 wt % cobalt. Therefore, when the light-transmitting member is attached to the inside of the metallic fixing member with glass, the cobalt effectively prevents part of the nickel plating layer deposited on the surface of the metallic fixing member from diffusing into the gold plating layer due to heat and atmosphere in attaching the light-transmitting member with glass, and the nickel plating layer does not appear on the surface of the gold plating layer at all. Accordingly it would not occur that a large amount of nickel oxide is formed on the surface of the gold plating layer. Therefore, the wettability of the gold plating layer to the brazing material may become high at all times to largely enhance the joint strength of the brazing material to the metallic fixing member, so that the metallic fixing member can be considerably firmly brazed and attached to the substrate.

In the method for producing a package for housing a photosemiconductor element of the invention it is preferable that the first step comprises:

(a4) a step of depositing a nickel plating layer on a surface of the tubular metallic fixing member and successively depositing a gold plating layer thereon;

(b4) a step of attaching the light-transmitting member to an inside of the metallic fixing member with glass; and (c4) a step of subjecting the metallic fixing member to a heat treatment in a reducing atmosphere.

According to the method for producing a package for housing a photosemiconductor element of the invention, after the light-transmitting member is attached to the metallic fixing member with glass, the metallic fixing member is subjected to a heat treatment in a reducing atmosphere. Therefore, when a large amount of nickel oxide having a poor wettability to the brazing material is formed on the surface of the gold plating layer due to diffusion and oxidation of the nickel plating layer serving as an under member, the nickel oxide is thoroughly removed by the heating treatment in the reducing atmosphere, with the result that the joint strength of the brazing material to the tubular metallic fixing member is largely enhanced, so that the tubular metallic fixing member can be considerably firmly brazed and attached to the substrate.

In the method for producing a package for housing a photosemiconductor element of the invention it is preferable that the reducing atmosphere is one selected from the group consisting of hydrogen atmosphere nitrogen atmosphere and an atmosphere of a mixture of hydrogen and nitrogen.

In the method for producing a package for housing a photosemiconductor element of the invention it is preferable that the heat treatment in the reducing atmosphere is carried out at temperatures of 500–1100° C.

In the method for producing a package for housing a photosemiconductor element of the invention it is preferable that the heat treatment in the reducing atmosphere is carried out at temperatures (e.g. 200–420° C.) lower than a melting point of the glass for use in attachment of the light-transmitting member.

In the method for producing a package for housing a photosemiconductor element of the invention it is preferable that the first step comprises:

(a5) a step of attaching the light-transmitting member to an inside of the metallic fixing member with glass;

(b5) a step of coating an exposed surface of the glass with a protective film; and (c5) a step of depositing a nickel plating layer on an exposed surface of the tubular metallic fixing member and successively depositing a gold plating layer thereon.

According to the method for producing a package for housing a photosemiconductor element of the invention, an exposed surface of the glass with which the light-transmitting member is attached to the inside of the metallic fixing member is coated with a protective film. Therefore, when the nickel plating layer and the gold plating layer are deposited in succession on the surface of the metallic fixing member to which the light-transmitting member is attached with glass, the glass would not be melted by a plating solution because protected by the protective film. Moreover, after the light-transmitting member is attached to the inside of the metallic fixing member, the nickel plating layer and the gold plating layer are deposited on the surface of the metallic fixing member. Therefore, it would not occur that part of the nickel plating layer is diffused and exposed to the surface of the gold plating layer and thereby oxidized to become nickel oxide, with the result that the attachment strength of the light-transmitting member to the metallic fixing member is enhanced, and the wettability of the gold plating layer to the brazing material may become high, so that the tubular metallic fixing member to which the light-transmitting member is attached can be considerably firmly brazed and attached to the substrate.

In the method for producing a package for housing a photosemiconductor element of the invention it is preferable that the protective film is one or more selected from the group consisting of silicon oxide, magnesium fluoride and titanium oxide, and the protective film is deposited on an exposed surface of the glass by a vacuum deposition method or ion beam method.

In the method for producing a package for housing a photosemiconductor element of the invention it is preferable that the first step comprises:

(a6) a step of depositing a nickel plating layer on a surface of the tubular metallic fixing member and successively depositing a gold plating layer thereon; and (b6) a step of attaching the light-transmitting member to an inside of the metallic fixing member with glass having a melting point of 320–400° C.

According to the method for producing a package for housing a photosemiconductor element of the invention, the glass attaching the light-transmitting member to the inside of the metallic fixing member has such a low-melting-point as 320–400° C. Therefore, when the light-transmitting member is attached to the metallic fixing member with the glass, it would not happen that part of the nickel plating layer deposited on the surface of the metallic fixing member is diffused in the gold plating layer, with the result that it would not happen that part of the nickel plating layer is diffused and exposed to the surface of the gold plating layer ad thereby oxidized to become nickel oxide. Therefore, the wettability of the gold plating layer to the brazing material may become preferable to largely enhance the joint strength of the brazing material to the tubular metallic fixing member, sot hat the tubular metallic fixing member can be considerably firmly brazed and attached to the substrate.

In the method for producing a package for housing a photosemiconductor element of the invention it is preferable that the glass with which the light-transmitting member is attached to the inside of the metallic fixing member has a low-melting-point (e.g. approx. 450=20 C.) lower than that of the light-transmitting member.

In the method for producing a package for housing a photosemiconductor element of the invention it is preferable that the low-melting-point glass comprises 50–65 wt % lead oxide, 0–10 wt % silicon oxide, 5–8 wt % boron oxide, 0–7 wt % aluminum oxide, 0–20 wt % tin oxide, 2–15 wt % titanium oxide and 10–15 wt % lead fluoride, and has a melting point of 320–400° C.

In the method for producing a package for housing a photosemiconductor element of the invention it is preferable that a thickness d23 of the gold plating layer is approximately 1–3 $\mu$m.

In the method for producing a package for housing a photosemiconductor element of the invention it is preferable that the substrate is made of ceramics or metal, and the metallic fixing member is made of a gold-nickel-cobalt alloy or iron-nickel alloy.

In the method for producing a package for housing a photosemiconductor element of the invention it is preferable that the light-transmitting member is made of noncrystalline glass.

In the method for producing a package for housing a photosemiconductor element of the invention it is preferable that a metallic flange to which the optical fiber member is fixed, is fixed to the metallic fixing member by laser welding.

In the method for producing a package for housing a photosemiconductor element of the invention it is preferable that a thickness d12 of the nickel plating layer is approximately 0.5 . 5 $\mu$m.

The invention provides a low-melting-point glass comprising 50–65 wt % lead oxide, 0–10 wt % silicon oxide, 5–8 wt % boron oxide, 0–7 wt % aluminum oxide, 0–20 wt % tin oxide, 2–15 wt % titanium oxide and 10–15 wt % lead fluoride, and has a melting point of 320–400° C.

BRIEF DESCRIPTION OF THE DRAWINGS

Other and further objects, features, and advantages of the invention will be more explicit from the following detailed description taken with reference to the drawings wherein:

FIG. 12 is a flow chart explaining attaching steps of the metallic fixing member 8 to the substrate 1 of a sixth embodiment as shown in FIGS. 5A–5C.

DETAILED DESCRIPTION OF THE PREFERRED EMBODIMENTS

Figure 1:
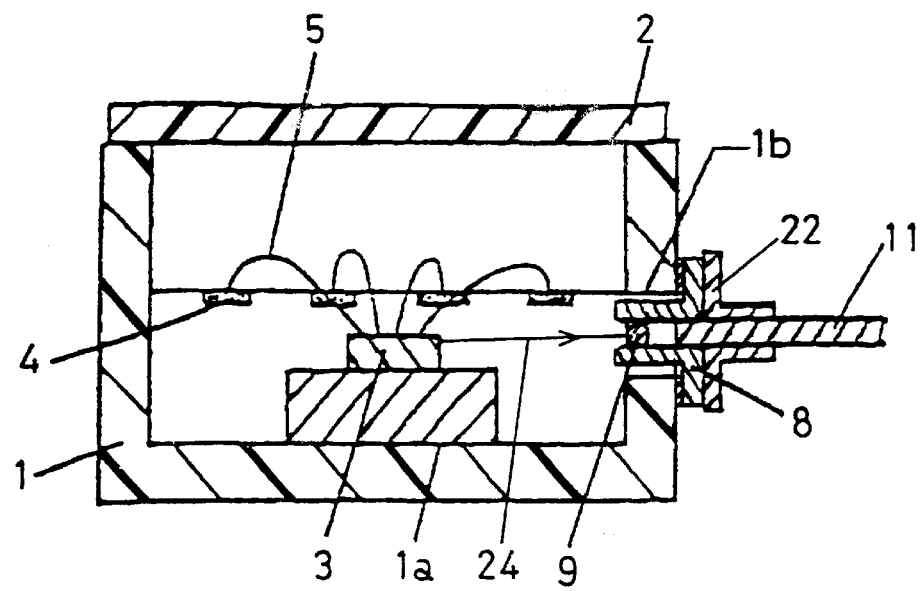
FIG. 1 is a sectional view showing an embodiment of a package for housing a photosemiconductor element according to the invention.
Figure 2:
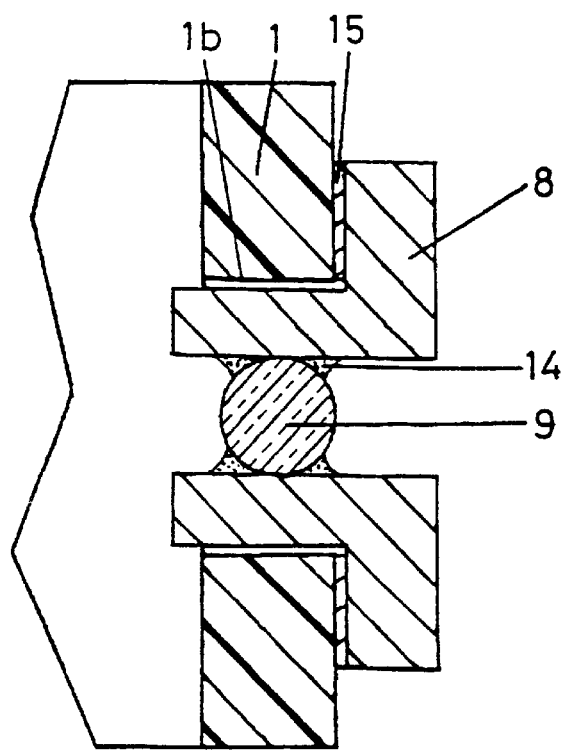
FIG. 2 is a sectional view of an essential part of the package for housing a photosemiconductor element shown in FIG. 1.
Figure 3:
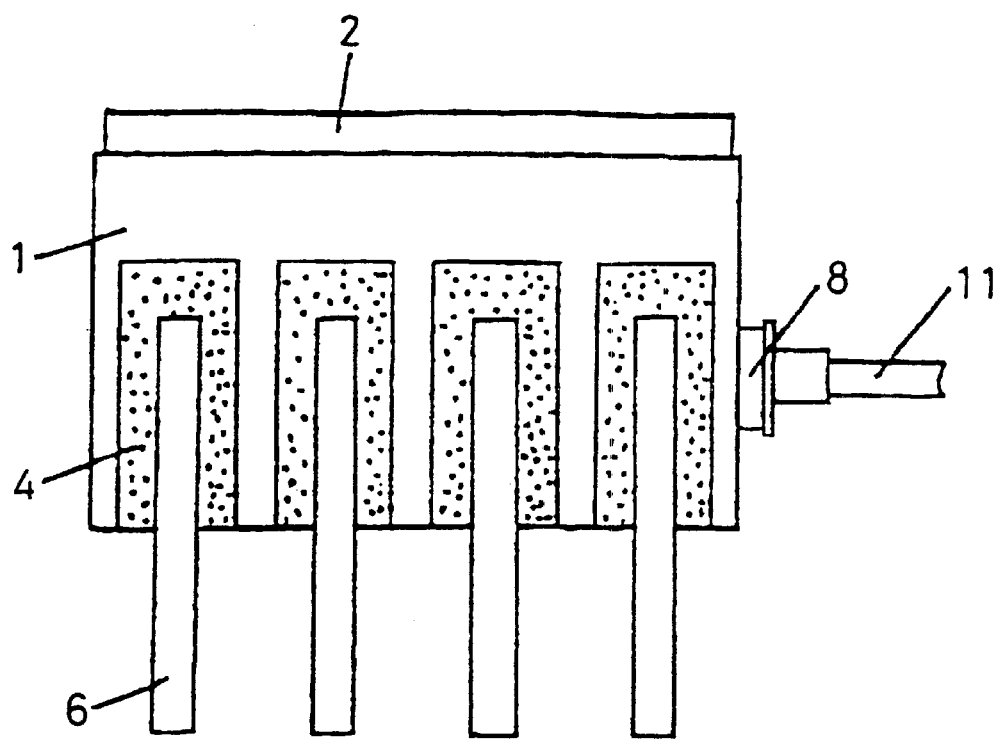
FIG. 3 is a side view of the package for housing a photosemiconductor element shown in FIG. 1.
Figure 4:
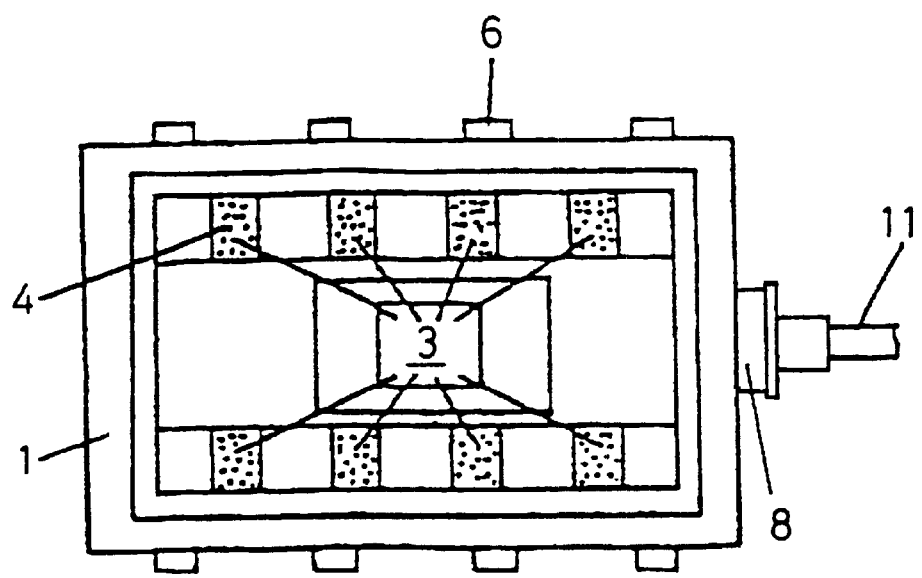
FIG. 4 is a plan view of the package for housing a photosemiconductor element shown in FIG. 1 from which a lid is removed.

Now referring to the drawings, preferred embodiments of the invention are described below.

FIGS. 1 to 4 show a first embodiment of a package for housing a photosemiconductor element produced by a producing method of the present invention, in which reference numeral 1 denotes a substrate and reference numeral 2 denotes a lid. The substrate 1 and the lid 2 compose a container for housing a photosemiconductor element 3.

The substrate 1 has, on the top surface thereof, a recess 1a forming a space for housing the photosemiconductor element 3, and the photosemiconductor element 3 is mounted and fixed on the bottom surface of the recess 1a.

The substrate 1 is made of, for example, ceramics such as sintered aluminum oxide, and produced by preparing a slurry material made by adding and mixing an appropriate organic binder, a solvent and the like to powder of a raw material such as aluminum oxide, silicon oxide, magnesium oxide or calcium oxide, making the slurry material into a ceramic green sheet (a ceramic raw sheet) by the doctor blade method or the calendar roll method, thereafter subjecting the ceramic green sheet to an appropriate punching process and laminating a plurality of sheets, and sintering them at a temperature of approximately 1500° C.

Further, a plurality of wiring layers 4 are deposited and formed on the substrate 1 from the inner surface of the recess 1a to the periphery of the substrate 1, whereby individual electrodes of the photosemiconductor element 3 are electrically connected via bonding wires 5 to the wiring layers 4 in a region where the wiring layers are exposed in the recess 1a, and outer lead terminals 6 are brazed and attached with brazing materials such as brazing silver to the wiring layers 4 in a region where the wiring layers 4 are formed on the periphery of the substrate 1.

The wiring layers 4, which function as electrically conducting paths when the individual electrodes of the photosemiconductor element 3 are connected to an external electric circuit, are made of powder of a high-melting-point metal such as tungsten, molybdenum or manganese.

The wiring layers 4 are deposited and formed from the inside of the recess 1a of the substrate 1 to the periphery of the substrate 1 by, for example, printing and coating the ceramic green sheet to become the substrate 1 with a metal paste prepared by adding and mixing an appropriate organic binder, a solvent and the like to powder of a high-melting-point metal such as tungsten, molybdenum or manganese, in a predetermined pattern by the conventional well-known screen printing method in advance.

Further, by depositing a metal having excellent resistance to corrosion and excellent wettability to the brazing material such as nickel or gold on the exposed surfaces of the wiring layers 4 to a thickness of 1 $\mu$m to 20 $\mu$m by a plating method, oxidation corrosion of the wiring layers 4 can be effectively prevented, and the outer lead terminals 6 can be firmly brazed to the wiring layers 4. Therefore, it is preferable to deposit a metal having excellent resistance to corrosion and excellent wettability to the brazing material such as nickel or gold on the exposed surfaces of the wiring layers 4 to a thickness of 1 $\mu$m to 20 $\mu$m.

Furthermore, the outer lead terminals 6 are brazed and attached to the wiring layers 4 with brazing materials such as brazing silver, and the outer lead terminals 6 have the function of electrically connecting the individual electrodes of the photosemiconductor element 3 housed in the container to an external electric circuit, so that by connecting the outer lead terminals 6 to an external electric circuit, the photosemiconductor element 3 housed in the container can be connected to the external electric circuit via the wiring layers 4 and the outer lead terminals 6.

The outer lead terminals 6 are made of metallic material such as an iron-nickel-cobalt alloy or an iron-nickel alloy, and formed into a predetermined shape by, for example, subjecting an ingot made of metallic material such as an iron-nickel-cobalt alloy to the conventional well-known metal processing method such as the rolling process method or the punching process method.

Further, by depositing a metal having excellent resistance to corrosion and excellent wettability to the brazing material such as nickel or gold on the exposed surfaces of the outer lead terminals 6 to a thickness of 1 $\mu$m to 20 $\mu$m by a plating method, oxidation corrosion of the outer lead terminals 6 can be effectively prevented, and the outer lead terminals 6 can be reliably and firmly connected to an external electric circuit. Therefore, it is preferable to deposit a metal having excellent resistance to corrosion and excellent wettability to the brazing material such as nickel or gold on the exposed surfaces of the outer lead terminals 6 to a thickness of 1 μm to 20 μm.

Furthermore, the substrate 1 to which the outer lead terminals 6 are attached has, on a side thereof, a through hole 1b, so that a tubular metallic fixing member 8 is inserted and fixed into the through hole 1b, and moreover a light-transmitting member 9 is attached to part of the inside of the metallic fixing member 8.

The through hole 1b formed on the side of the substrate 1 is formed into a predetermined shape on the side of the substrate 1 by, for example, forming a hole on the ceramic green sheet to become the substrate 1 by the punching process method in advance, or subjecting the side of the substrate 1 to a drilling process.

Further, the tubular metallic fixing member 8 is attached on the periphery of the substrate 1 around the through hole 1b. The metallic fixing member 8, which functions as an under fixing member when an optical-fiber member 11 is fixed to the substrate 1 and has the function of transmitting light excited by the photosemiconductor element 3 to the optical-fiber member 11, is made of metallic material such as an iron-nickel-cobalt alloy or an iron-nickel alloy.

Here, the metallic fixing member 8 is made by, for example, forming an ingot of an iron-nickel-cobalt alloy or the like into a tube by a pressing process.

Further, the metallic fixing member 8 is attached to the periphery of the substrate 1 by depositing a metal layer made of tungsten, molybdenum or the like on the periphery of the substrate 1 around the through hole 1b in advance and brazing a flange disposed to the tubular metallic fixing member 8 to the metal layer.

Furthermore, the light-transmitting member 9 is attached to part of the inside of the tubular metallic fixing member 8. The light-transmitting member 9 block the inside of the metallic fixing member 8, and has the function of keeping the container composed of the substrate 1 and the lid 2 to be hermetically sealed while transmitting light 24 excited by the photosemiconductor element 3 transmitted in the inner space of the metallic fixing member 8 as it is to the optical-fiber member 11 attached and connected to the metallic fixing member 8.

The light-transmitting member 9 is made of, for example, lead-type noncrystalline glass in which the major constituents are silicon oxide and lead oxide and boro-silicate-type noncrystalline glass in which the major constituents are boric acid and quartz sand, and the noncrystalline glass does not have any crystal axis. Therefore, when light excited by the photosemiconductor element 3 is passed through the light-transmitting member 9 and received by the optical-fiber member 11, the light excited by the photosemiconductor element 3 is received by the optical-fiber member 11 as it is without making double refraction. As a result, reception of the light excited by the photosemiconductor element 3 by the optical-fiber member 11 may become highly efficient, and thereby the transmission efficiency of optical signals can be increased.

Still further, the flange 22 attached to the optical-fiber member 11 is welded to the outer end of the tubular metallic fixing member 8 by laser light beams such as YAG, whereby the optical-fiber member 11 for transmitting optical signals to the photosemiconductor element 3 can be fixed to the substrate 1. The flange 22 is made of the metallic material the same as the metallic fixing member 8.

Still further, on the top surface of the substrate 1, for example, the lid 2 made of metallic material such as an iron-nickel-cobalt alloy or an iron-nickel alloy is joined, whereby the photosemiconductor element 3 can be hermetically sealed into the container composed of the substrate 1 and the lid 2.

The lid 2 is formed into a predetermined shape by, for example, subjecting an ingot of an iron-nickel-cobalt alloy or the like to the conventional well-known metal processing method such as the rolling process method or the punching process method.

Thus, with the package for housing a photosemiconductor element according to the invention, by placing and fixing the photosemiconductor element 3 on the recess 1a of the substrate 1 while electrically connecting the individual electrodes of he photosemiconductor element 3 to the wiring layers 4 via the bonding wires 5, subsequently joining the lid 2 to the top surface of the substrate 1 to house the photosemiconductor element 3 into the container composed of the substrate 1 and the lid 2, finally attaching and connecting the optical-fiber member 11 to the tubular metallic fixing member 8 attached to the substrate 1, a photosemiconductor device is completed as a final product.

Such a photosemiconductor device is used in high-speed communication or the like by causing the photosemiconductor element 3 to excite light in a predetermined manner on the basis of driving signals supplied from an external electric circuit, and causing the optical-fiber member 11 to receive the excited light via the light-transmitting member 9 while transmitting the light in the optical fiber of the optical-fiber member 11.

Next, attachment of the metallic fixing member 8 to the substrate 1 in the package for housing a photosemiconductor element will be explained referring to FIGS. 5A–5C. FIG. 6 is a flow chart explaining attaching steps of the metallic fixing member 8 to the substrate 1 of a first embodiment as shown in FIGS. 5A–5C.

Figure 5A:
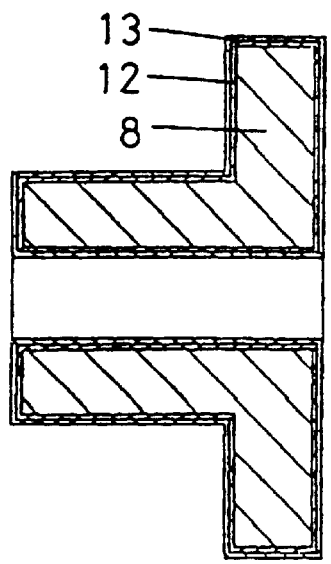
FIGS. 5A–5C are sectional views of an essential part of the package for housing a photosemiconductor element shown in FIG. 1 in the individual process steps of brazing and attaching a metallic fixing member to a substrate.
Figure 5B:
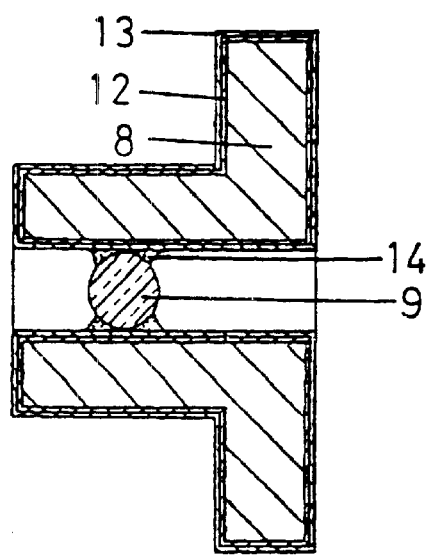
Figure 5C:
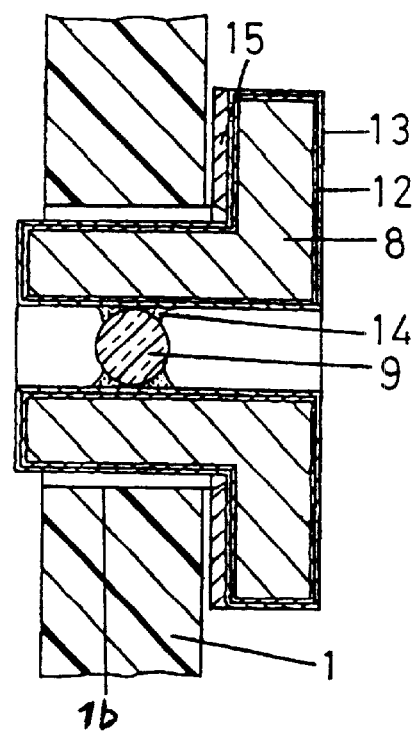
Figure 6:
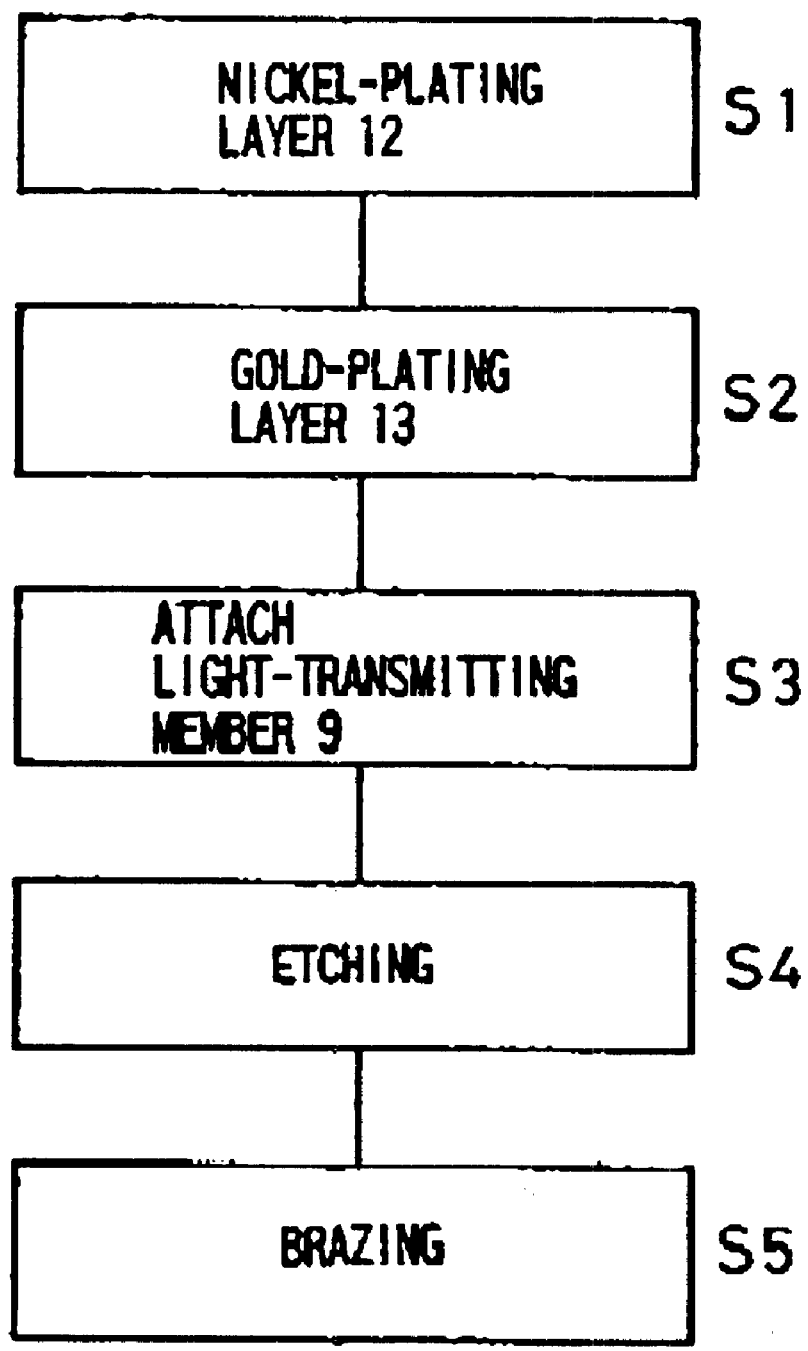
FIG. 6 is a flow chart explaining attaching steps of the metallic fixing member 8 to the substrate 1 of a first embodiment as shown in FIGS. 5A–5C.

At first, as shown in FIG. 5A, a nickel plating layer 12 and a gold plating layer 13 are deposited in succession on the surface of the tubular metallic fixing member 8 so that the tubular metallic fixing member 8 is brazed and attached to the substrate 1 reliably and firmly.

At step s1 of FIG. 6, the nickel plating layer 12 is an under member for firmly depositing the gold plating layer 13 to the metallic fixing member 8, and is deposited to a thickness d12 of approximately 0.5 μm to 5 μm on the surface of the metallic fixing member 8 by the electrolytic plating method or the electroless plating method.

In the case of adopting the electrolytic plating method, the nickel plating layer 12 is formed, for example, by soaking the metallic fixing member 8 in a plating bath consisting of nickel nitrate, nickel chloride and boric acid ($NiSO_4 \cdot 6H_2O$+ $NiCl_2 \cdot 6H_2O$+$H_3BO_9$) while applying a plating power having an electric current density of about 0.1–2 $A/dm^2$ to the metallic fixing member 8.

Further, at step s2 of FIG. 6, the gold plating layer 13 has the function of enhancing the wettability of the brazing material to the metallic fixing member 8, and is deposited to a thickness d13 of approximately 3 μm to 8 μm on the nickel plating layer 12 by the electrolytic plating method or the electroless plating method.

In the case of adopting the electrolytic plating method, the gold plating layer 13 is formed, for example, by soaking the metallic fixing member 8 with the nickel plating layer 12 deposited on the surface thereof in a gold plating bath consisting of gold potassium cyanide and potassium phosphate while applying a plating power having an electric current density of 0.2–1.5 A/dm² to the metallic fixing member 8.

Next, at step s3 of FIG. 6, as shown in FIG. 5B, the light-transmitting member 9 is attached to the inside of the metallic fixing member 8 with glass 14 to block the inside.

The light-transmitting member 9 is attached to the metallic fixing member 8 by coating the inside of the metallic fixing member 8 with, for example, low-melting-point solder glass 14 having a lower melting point than the melting point of the light-transmitting member 9, placing the light-transmitting member 9 on the coating low-melting-point solder glass 14, and thereafter heating them up to a temperature of approximately 450° C., preferably 430 to 480° C., in the air to melt the low-melting-point solder glass 14. The melting point of the low-melting-point solder glass 14 is in the range of 420 to 470° C. In this case, due to heat and atmosphere in glass attachment, part of the nickel plating layer 12 deposited on the surface of the metallic fixing member 8 is diffused in the gold plating layer 13 and exposed to the surface of the gold plating layer 13, and the nickel exposed to the surface of the gold plating layer 13 is oxidized to become nickel oxide, with the result that a large amount of nickel oxide is formed on the surface of the gold plating layer 13.

Next, at step s4 of FIG. 6, the gold plating layer 13 deposited on the surface of the metallic fixing member 8 is subjected to an etching treatment, and part of the surface of the gold plating layer 13 is removed, for example, by a thickness d23 (d23<d13) of approximately 0.5 $\mu$m to 3 $\mu$m.

The etching treatment is conducted to remove nickel oxide formed on the surface of the gold plating layer 13 deposited on the metallic fixing member 8 and improve the wettability of the gold plating layer 13 to the brazing material.

The etching treatment is performed, for example, by soaking the metallic fixing member 8 in an etching solution consisting of CN—Pb (potassium cyanide·lead monoxide+a chelating agent) for one to two minutes.

On the metallic fixing member 8, nickel oxide having a poor wettability to the brazing material formed on the surface of the gold plating layer 13 is removed by the etching treatment, so that the wettability of the gold plating layer 13 to the brazing material can be considerably preferable.

Finally, at step s5 of FIG. 6, the metallic fixing member 8 is brazed and attached with a brazing material 15 to a metal layer deposited in advance around the through hole 1b of the substrate 1, whereby, as shown in FIG. 5C, brazing attachment of the metallic fixing member 8 to the substrate 1 is completed.

The metallic fixing member 8 is brazed and attached to the substrate 1 by placing the low-melting-point brazing material 15 made of an gold-tin alloy (gold: 80 wt %, tin: 20 wt %) or the like on the metal layer deposited around the through hole 1b of the substrate 1 so as to be sandwiched between the fixing member 8 and the substrate 1, and thereafter heating them up to a temperature of approximately 300° C. to melt the low-melting-point brazing material 15. In this case, on the metallic fixing member 8, nickel oxide having a poor wettability to the brazing material formed on the surface of the gold plating layer 13 is removed by the etching treatment, so that the gold plating layer 13 and the brazing material 15 are considerably firmly joined to each other, and thereby the metallic fixing member 8 is brazed and attached to the substrate 1 considerably firmly.

Next, the attachment of the metallic fixing member to the substrate in the package for housing a photosemiconductor element of a second embodiment will be explained referring to FIG. 7.

The second embodiment is similar to the first embodiment shown in FIGS. 1 to 6 and corresponding parts are denoted by the same reference characters. The second embodiment is explained referring to FIGS. 1 to 6.

At first, as shown in FIG. 5A, a nickel plating layer 12 and a gold plating layer 13 are deposited in succession on the surface of the tubular metallic fixing member 8 so that the tubular metallic fixing member 8 is brazed and attached to the substrate 1 reliably and firmly.

Step s11 at which the nickel plating layer 12 is deposited is the same as the step s1 of FIG. 6 of the first embodiment.

Figure 7:
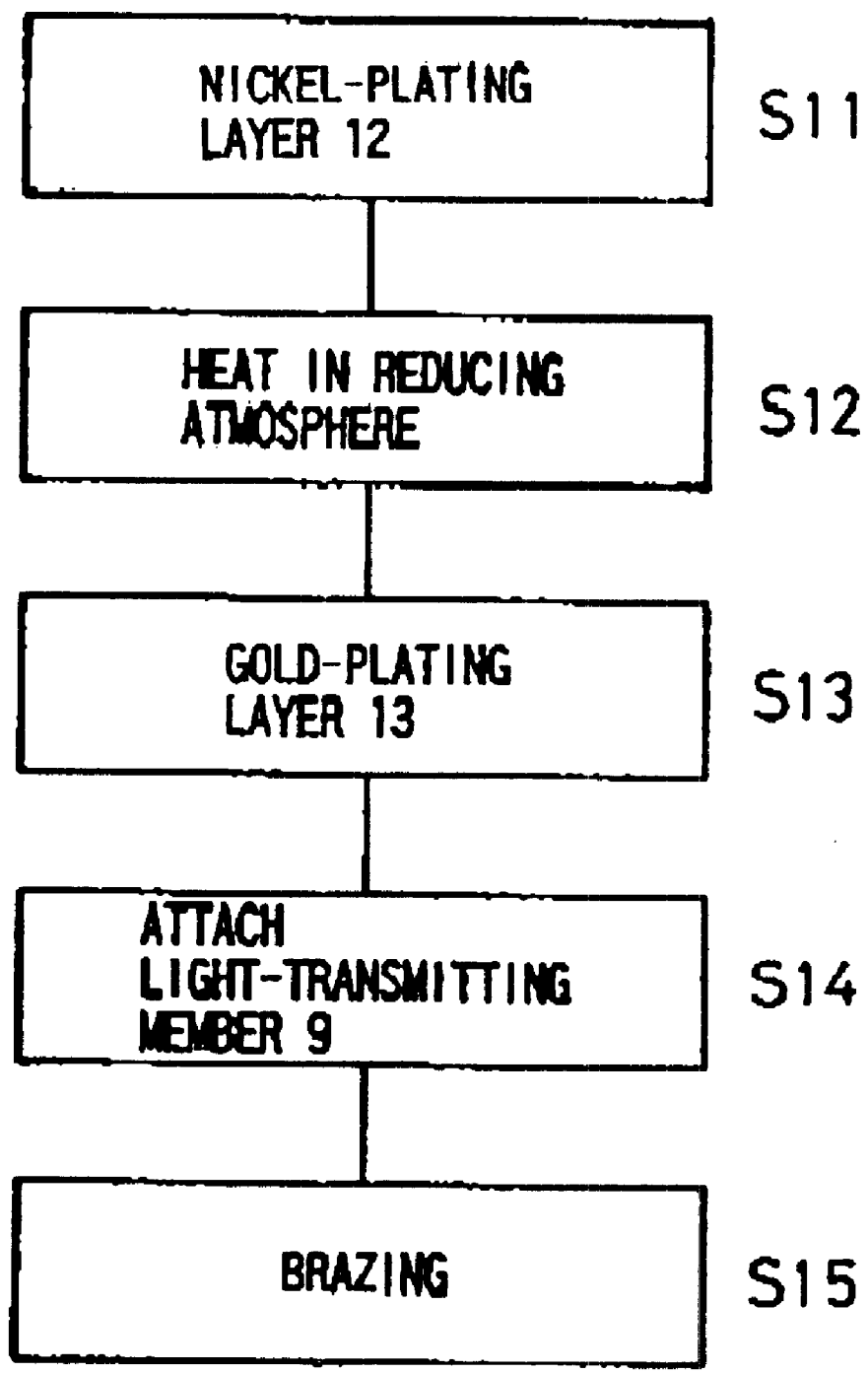
FIG. 7 is a flow chart explaining attaching steps of the metallic fixing member 8 to the substrate 1 of a second embodiment as shown in FIGS. 5A–5C.

Next, at step s12 of FIG. 7, the metallic fixing member 8 with the nickel plating layer 12 deposited thereon is subjected to a heat treatment in a reducing atmosphere.

The reducing atmosphere is preferred to be a hydrogen atmosphere, a nitrogen atmosphere, or a mixed atmosphere of hydrogen and nitrogen, and the temperature for the heat treatment is preferred to be in the range of 500–1100° C.

The nickel plating layer 12 is subjected to a heat treatment in a reducing atmosphere and printed on the metallic fixing member 8, so that the nickel plating layer 12 would hardly be diffused in the gold plating layer 13 when heat is applied.

Next, at step s13 of FIG. 7, the gold plating layer 13 is deposited on the nickel plating layer 12 having been subjected to a heat treatment in a reducing atmosphere.

The gold plating layer 13 has the function of enhancing the wettability of the brazing material to the metallic fixing member 8, and is deposited to a thickness of approximately 1 $\mu$m to 3 $\mu$m on the nickel plating layer 12 by the electrolytic plating method or the electroless plating method.

In the case of adopting the electrolytic plating method, the gold plating layer 13 is formed, for example, by soaking the metallic fixing member 8 with the nickel plating layer 12 deposited on the surface thereof in a gold plating bath consisting of gold potassium cyanide and potassium phosphate while applying a plating power having an electric current density of about 0.2–1.5 A/dm² to the metallic fixing member 8.

Next, at step s14 of FIG. 7, as shown in FIG. 5B, the light-transmitting member 9 is attached to the inside of the metallic fixing member 8 with glass 14 to block the inside.

The light-transmitting member 9 is attached to the metallic fixing member 8 by coating the inside of the metallic fixing member 8 with, for example, low-melting-point solder glass 14 having a lower melting point than the melting point of the light-transmitting member 9, placing the light-transmitting member 9 on the coating low-melting-point solder glass 14, and thereafter heating them up to a temperature of approximately 450° C. in the air to melt the low-melting-point solder glass 14. In this case, the nickel plating layer 12 deposited on the surface of the metallic fixing member 8 is printed on the metallic fixing member 8 by a heat treatment in a reducing atmosphere, so that it would not happen that the nickel plating layer 12 is diffused in the gold plating layer 13 due to heat and atmosphere in glass attachment and exposed to the surface of the gold plating layer 13, and it would not happen either that exposed nickel is oxidized to become nickel oxide. Therefore, the wettability of the gold plating layer 13 to the brazing material can be considerably excellent.

Finally, at step s15 of FIG. 7, the metallic fixing member 8 is brazed and attached with a brazing material 15 to a metal layer deposited in advance around the through hole 1b of the substrate 1, whereby, as shown in FIG. 5C, brazing attachment of the metallic fixing member 8 to the substrate 1 is completed.

The metallic fixing member 8 is brazed and attached to the substrate 1 by placing the low-melting-point brazing material 15 made of an gold-tin alloy (gold: 80 wt %, tin: 20 wt %) or the like on the metal layer deposited around the through hole 1b of the substrate 1 so as to be sandwiched between the fixing member 8 and the substrate 1, and thereafter heating them up to a temperature of approximately 300° C. to melt the low-melting-point brazing material 15. In this case, it would hardly happen that nickel oxide having a poor wettability to the brazing material 15 is formed on the surface of the gold plating layer 13 deposited on the metallic fixing member 8, so that the gold plating layer 13 and the brazing material 15 are considerably firmly joined to each other, and thereby the metallic fixing member 8 can be brazed and attached to the substrate 1 considerably firmly.

Next, the attachment of the metallic fixing member to the substrate in the package for housing a photosemiconductor element of a third embodiment will be explained referring to FIG. 8. The third embodiment is similar to the first and second embodiments, and corresponding parts are denoted by the same reference characters. Attaching steps of the metallic fixing member 8 to the substrate 1 are explained referring to FIG. 8.

At first, as shown in FIG. 5A, a nickel plating layer 12 and a gold plating layer 13 are deposited in succession on the surface of the tubular metallic fixing member 8 so that the tubular metallic fixing member 8 is brazed and attached to the substrate 1 reliably and firmly.

Figure 8:
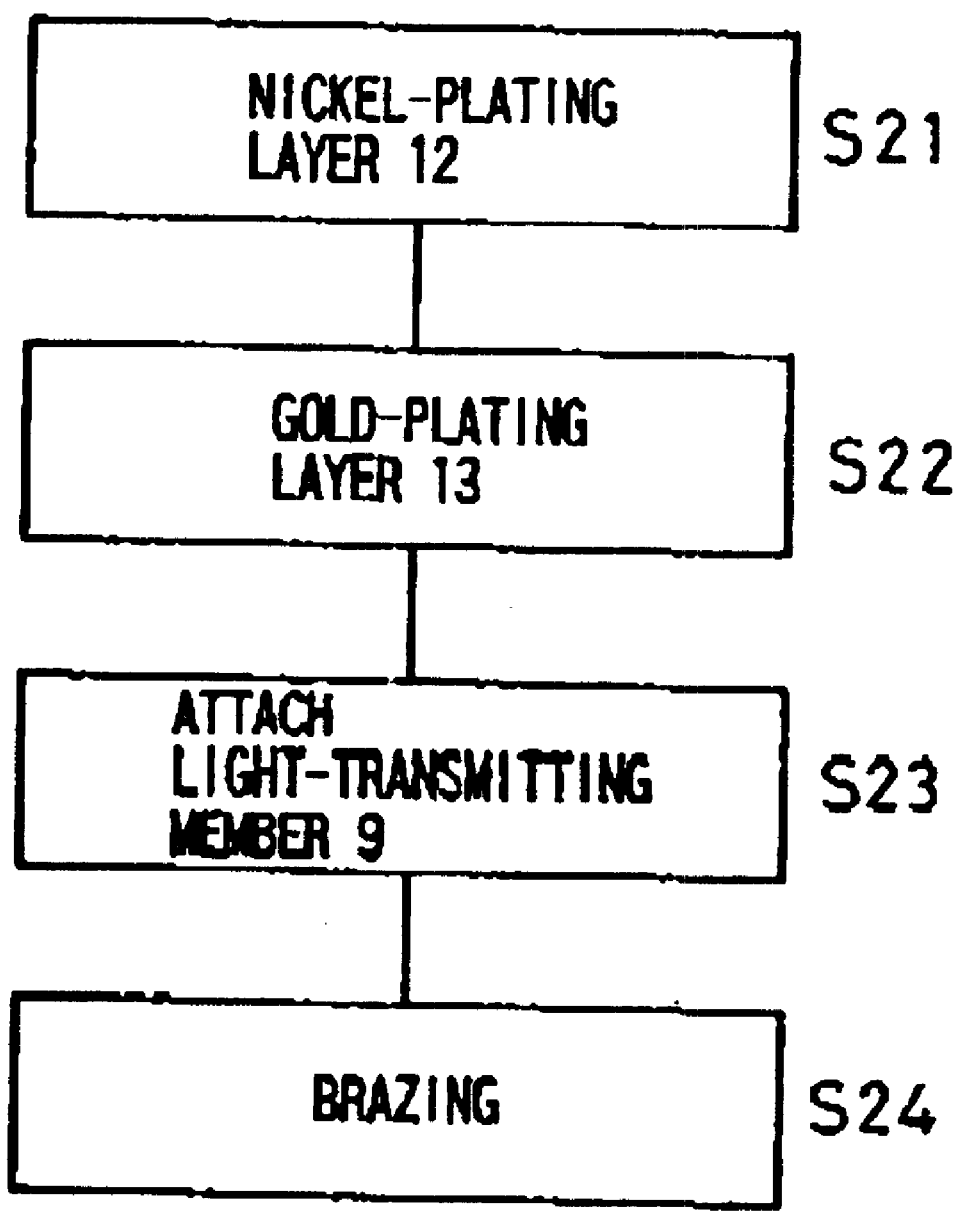
FIG. 8 is a flow chart explaining attaching steps of the metallic fixing member 8 to the substrate 1 of a third embodiment as shown in FIGS. 5A–5C.

As step s21 of FIG. 8, the nickel plating layer 12 is an under member for firmly depositing the gold plating layer 13 to the metallic fixing member 8, and is deposited to a thickness of approximately 0.5 μm to 5 μm on the surface of the metallic fixing member 8 by the electrolytic plating method or the electroless plating method.

In the case of adopting the electrolytic plating method, the nickel plating layer 12 is formed by soaking the metallic fixing member 8 in, for example, a nickel plating bath prepared by adding nickel sulfite to the conventional well-known watt nickel bath while applying a plating power having an electric current density of about 0.1–2 A/dm² to the metallic fixing member 8.

Further, the nickel plating layer 12 consists of 35–99 wt % nickel and 1–65 wt % cobalt, that is, contains 1–65 wt % cobalt. Therefore, when the light-transmitting member 9 is attached to the inside of the metallic fixing member 8 with the glass 14 as mentioned later, it is effectively prevented that a part of the nickel plating layer 12 deposited on the surface of the metallic fixing member 8 is diffused in the gold plating layer 13 due to heat and atmosphere in glass attachment. As a result, it would not happen that nickel is exposed to the surface of the gold plating layer 13, and it would hardly happen either that exposed nickel is oxidized to become nickel oxide.

Here, in a case where the cobalt content is less than 1 wt %, the nickel plating layer 12 is not capable of effectively preventing that a part of the nickel plating layer 12 is diffused in the gold plating layer 13, whereas in a case where the cobalt content is more than 65 wt %, the wettability of the brazing material is worsened, and the adhesion thereof to the gold plating layer 13 is worsened. Therefore, it is specified that the nickel plating layer 12 contains cobalt in the range of 1–65 wt %, that is, contains 35–99 wt % nickel and 1–65 wt % cobalt.

Furthermore, at step s22 of FIG. 8, the gold plating layer 13 is deposited on the surface of the nickel plating layer 12. The gold plating layer 13, which has the function of enhancing the wettability of the brazing material to the metallic fixing member 8, is deposited to a thickness of approximately 1 μm to 3 μm on the nickel plating layer 12 by the electrolytic plating method or the electroless plating method. The gold plating layer 13 at the step s22 of FIG. 8 is formed by the same electrolytic plating method as the step s2 of FIG. 6.

Next, at step s23 of FIG. 8, as shown in FIG. 5B, the light-transmitting member 9 is attached to the inside of the metallic fixing member 8 with glass 14 to block the inside.

The light-transmitting member 9 is attached to the metallic fixing member 8 by coating the inside of the metallic fixing member 8 with, for example, low-melting-point solder glass 14 having a lower melting point than the melting point of the light-transmitting member 9, placing the light-transmitting member 9 on the coating low-melting-point solder glass 14, and thereafter heating them up to a temperature of approximately 450° C. in the air to melt the low-melting-point solder glass 14. In this case, the nickel plating layer 12 deposited on the surface of the metallic fixing member 8 contains cobalt, so that it is effectively prevented that a part of the nickel plating layer 12 is diffused in the gold plating layer 13. As a result, it would not happen that nickel is exposed to the surface of the gold plating layer 13, and it would hardly happen either that exposed nickel is oxidized to become nickel oxide.

Finally, at step s24 of FIG. 8, the metallic fixing member 8 is brazed and attached with a brazing material 15 to a metal layer deposited in advance around the through hole 1b of the substrate 1, whereby, as shown in FIG. 5C, brazing attachment of the metallic fixing member 8 to the substrate 1 is completed. The step s24 of FIG. 8 is the same as the step s15 of FIG. 7.

Next, attachment of the metallic fixing member to the substrate in the package for housing a photosemiconductor element of a fourth embodiment will be explained referring to FIG. 9. The fourth embodiment shown in FIG. 9 is similar to the foregoing embodiments and corresponding parts are denoted by the same reference characters.

At first, as shown in FIG. 5A, a nickel plating layer 12 and a gold plating layer 13 are deposited in succession on the surface of the tubular metallic fixing member 8 so that the tubular metallic fixing member 8 is brazed and attached to the substrate 1 reliably and firmly.

Figure 9:
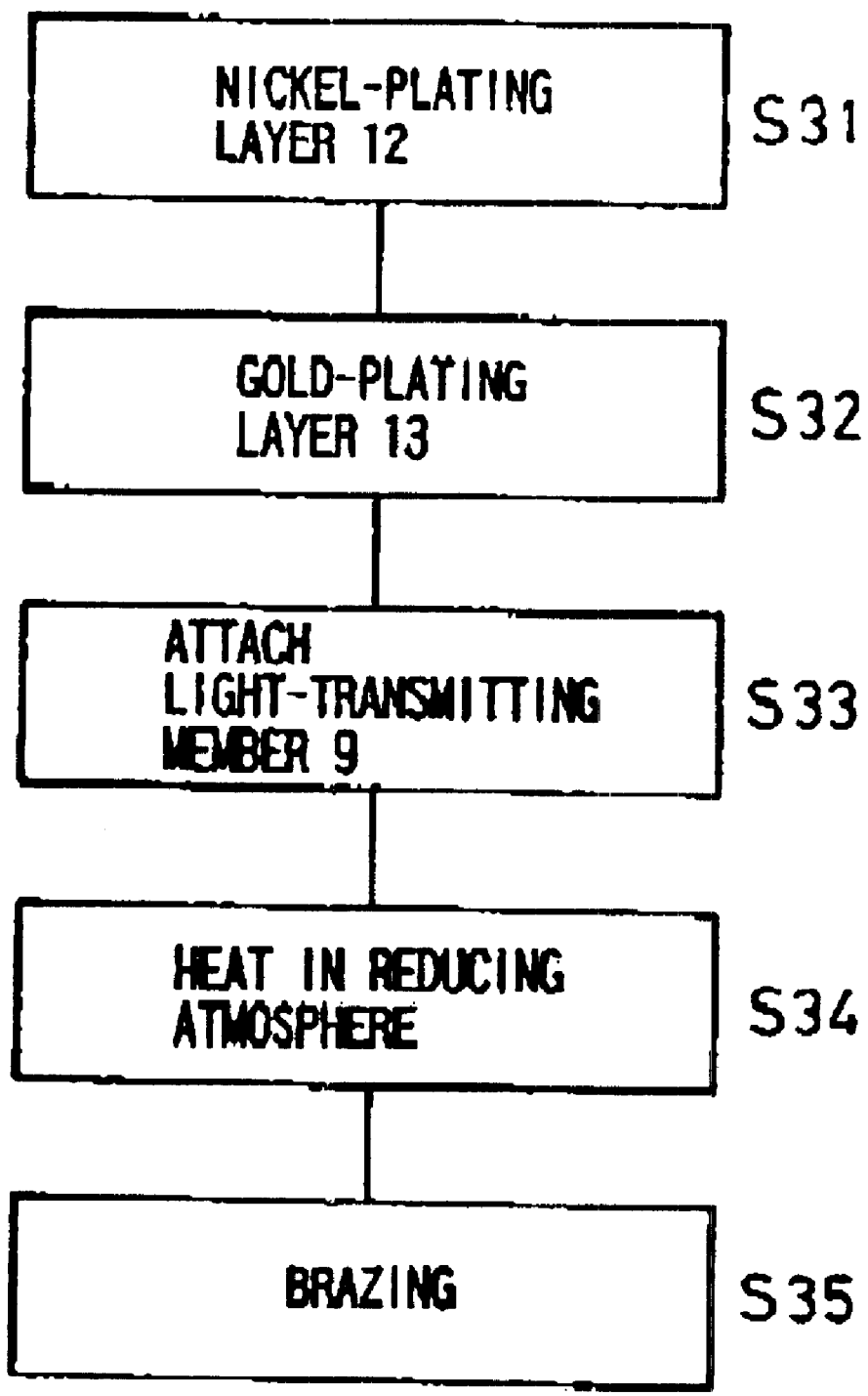
FIG. 9 is a flow chart explaining attaching steps of the metallic fixing member 8 to the substrate 1 of a fourth embodiment as shown in FIGS. 5A–5C.

At step s31 of FIG. 9, the nickel plating layer 12 is an under member for firmly depositing the gold plating layer 13 to the metallic fixing member 8, and is deposited to a thickness of approximately 0.5 μm to 5 μm on the surface of the metallic fixing member 8 by the electrolytic plating method or the electroless plating method. The nickel plating layer 12 is formed by the same electrolytic plating method as the step s1 of FIG. 6.

Further, at step s32 of FIG. 9, the gold plating layer 13 has the function of enhancing the wettability of the brazing material to the metallic fixing member 8, and is deposited to a thickness of approximately 1 μm to 3 μm on the nickel plating layer 12 by the electrolytic plating method or the electroless plating method. The gold plating layer 13 is formed by the same electrolytic plating method as the step s2 of FIG. 6.

Next, at step s33 of FIG. 9, as shown in FIG. 5B, the light-transmitting member 9 is attached to the inside of the metallic fixing member 8 with glass 14 to block the inside.

The light-transmitting member 9 is attached to the metallic fixing member 8 by coating the inside of the metallic fixing member 8 with, for example, low-melting-point solder glass 14 having a lower melting point than the melting point of the light-transmitting member 9, placing the light-transmitting member 9 on the coating low-melting-point solder glass 14, and thereafter heating them up to a temperature of approximately 450° C. in the air to melt the low-melting-point solder glass 14. In this case, due to heat and atmosphere in glass attachment, a part of the nickel plating layer 12 deposited on the surface of the metallic fixing member 8 is diffused in the gold plating layer 13 and exposed to the surface of the gold plating layer 13, and the nickel exposed to the surface of the gold plating layer 13 is oxidized to become nickel oxide, with the result that a large amount of nickel oxide is formed on the surface of the gold plating layer 13. Such a phenomenon is the same as the step s3 of FIG. 6.

Next, at step s34 of FIG. 9, the metallic fixing member 8 is subjected to a heat treatment in a reducing atmosphere, and a large amount of nickel oxide formed on the surface of the gold plating layer 13 is reduced and removed.

The reducing atmosphere is preferred to be a hydrogen atmosphere, a nitrogen atmosphere, or a mixed atmosphere of hydrogen and nitrogen, and the temperature for the heat treatment is preferred to be less than the melting point of the glass 14 attaching the light-transmitting member 9 to the metallic fixing member 8, for example, in the range of 200–420° C.

On the metallic fixing member 8, nickel oxide having a poor wettability to the brazing material formed on the surface of the gold plating layer 13 is removed by a heat treatment in a reducing atmosphere, so that the wettability of the gold plating layer 13 to the brazing material can be considerably preferable.

Finally, at step s35 of FIG. 9, the metallic fixing member 8 is brazed and attached with a brazing material 15 to a metal layer deposited in advance around the through hole 1b of the substrate 1, whereby, as shown in FIG. 5C, brazing attachment of the metallic fixing member 8 to the substrate 1 is completed.

The metallic fixing member 8 is brazed and attached to the substrate 1 by placing the low-melting-point brazing material 15 made of an gold-tin alloy (gold: 80 wt %, tin: 20 wt %) or the like on the metal layer deposited around the through hole 1b of the substrate 1 so as to be sandwiched between the fixing member 8 and the substrate 1, and thereafter heating them up to a temperature of approximately 300° C. to melt the low-melting-point brazing material 15. In this case, on the metallic fixing member 8, nickel oxide having a poor wettability to the brazing material formed on the surface of the gold plating layer 13 is removed by a heat treatment in a reducing atmosphere, so that the gold plating layer 13 and the brazing material 15 are considerably firmly joined to each other, and thereby the metallic fixing member 8 can be brazed and attached to the substrate 1 considerably firmly.

Next, attachment of the metallic fixing member 8 to the substrate in the package for housing a photosemiconductor element of a fifth embodiment will be explained referring to FIGS. 10A–10C.

Figure 11:
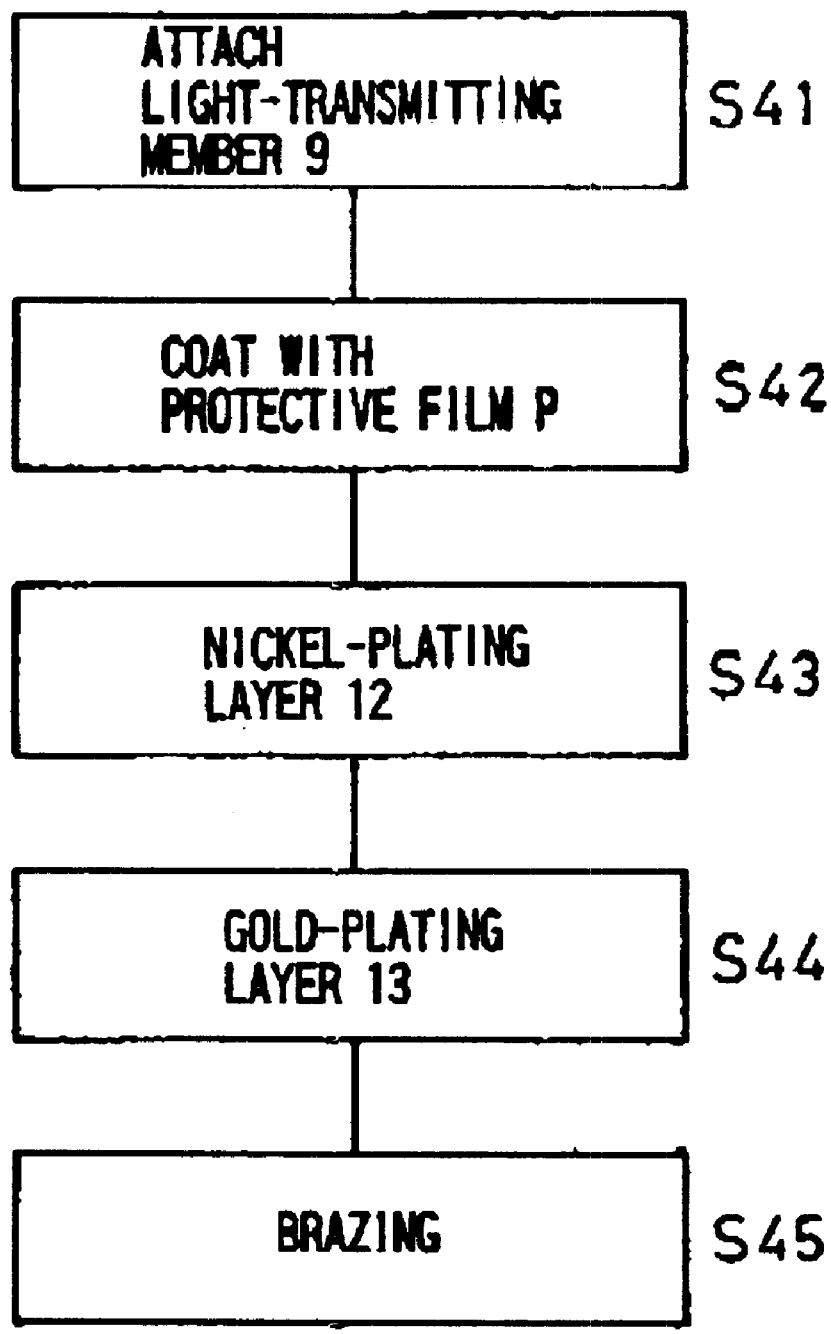
FIG. 11 is a flow chart explaining attaching steps of the metallic fixing member 8 to the substrate 1 of a fifth embodiment as shown in FIGS. 10A–10C.

The attaching steps of the metallic fixing member 8 to the substrate 1 of the fifth embodiment is shown in FIG. 11. The fifth embodiment is similar to the foregoing embodiments and corresponding parts are denoted by the same reference characters.

Figure 10A:
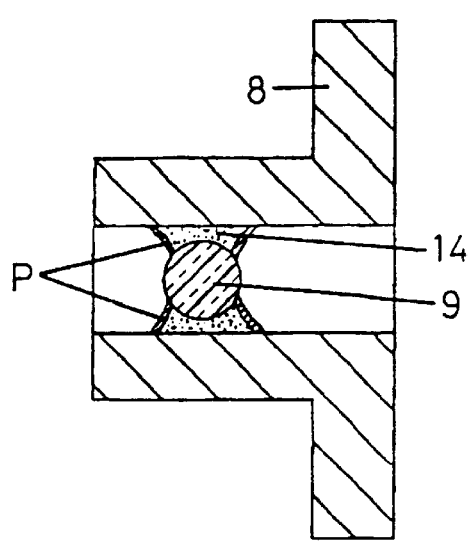
FIGS. 10A–10C are sectional views of an essential part of the package for housing a photosemiconductor element shown in FIG. 1 in the individual process steps of brazing and attaching a metallic fixing member to a substrate.

At first, at step s41 of FIG. 11, as shown in FIG. 10A, the light-transmitting member 9 is attached to the inside of the metallic fixing member 8 with the glass 14 to block the inside.

The light-transmitting member 9 is attached to the metallic fixing member 8 by coating the inside of the metallic fixing member 8 with, for example, low-melting-point solder glass 14 having a lower melting point than the melting point of the light-transmitting member 9, placing the light-transmitting member 9 on the coating lower-melting-point solder glass 14, and thereafter heating them up to a temperature of approximately 450° C. in the air to melt the low-melting-point solder glass 14.

Next, at step s42 of FIG. 11, an exposed surface of the glass 14 attaching the light-transmitting member 9 to the metallic fixing member 8 is coated with a protective film P.

As the protective film P, it is preferred to use at least one of silicon oxide, magnesium fluoride, and titanium oxide, which can be used as optical films having excellent chemical resistance, and deposit to a thickness enough to enhance the optical transmittance on the exposed surface of the glass 14 by the vacuum evaporation method, the ion beam evaporation method or the like.

Figure 10B:
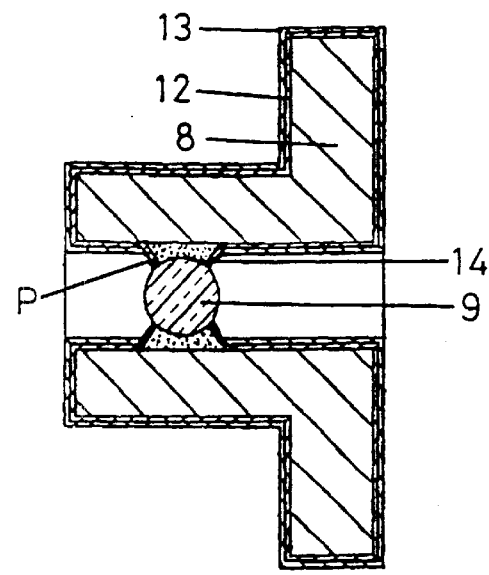

Next, at step s43 of FIG. 11, as shown in FIG. 10B, the nickel plating layer 12 and the gold plating layer 13 are deposited in succession on the surface of the tubular metallic fixing member 8 so that the metallic fixing member 8 is reliably and firmly attached to the substrate 1 reliable and firm.

The nickel plating layer 12 at the step s43 of FIG. 11 is formed the same as the step s1 of FIG. 6.

Further, at step s44 of FIG. 11, the gold plating layer 13 has the function of enhancing the wettability of the brazing material to the metallic fixing member 8, and is deposited to a thickness of approximately 0.5 $\mu$m to 3 $\mu$m on the nickel plating layer 12 by the electrolytic plating method or the electroless plating method. The gold plating layer 13 is formed by the same electrolytic plating method as the step s2 of FIG. 6.

Furthermore, although when the nickel plating layer 12 and the gold plating layer 13 are deposited in succession on the surface of the metallic fixing member 8, a chemical of a plating solution may act on the glass 14 attaching the light-transmitting member 9 to the inside of the metallic fixing member 8, the glass 14 would not be melted because an exposed surface thereof is coated and protected with the protective film P comprising silicon oxide, magnesium fluoride, titanium oxide or the like having excellent chemical resistance. As a result, the attachment strength of the light-transmitting member 9 to the metallic fixing member 8 can be considerably firm.

Still further, the nickel plating layer 12 and the gold plating layer 13 are deposited on the surface of the metallic fixing member 8 after the light-transmitting member 9 is attached to the inside of the metallic fixing member 8 with the glass 14. Therefore, it would not happen that heat acts on the nickel plating layer 12 and the gold plating layer 13, with the result that it would not happen that a part of the nickel plating layer 12 would be diffused in the gold plating layer 13 to be exposed to the surface of the gold plating layer 13, and it would not happen either that exposed nickel is oxidized to become nickel oxide. Therefore, the wettability of the gold plating layer 13 to the brazing material can be considerably preferable.

Figure 10C:
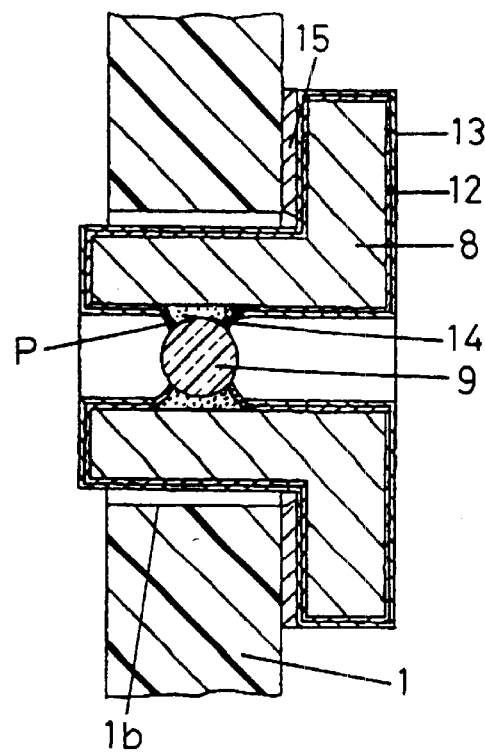

Finally, at step s45 of FIG. 11, the metallic fixing member 8 is brazed and attached with a brazing material 15 to a metal layer deposited in advance around the through hole 1b of the substrate 1, whereby, as shown in FIG. 10C, brazing attachment of the metallic fixing member 8 to the substrate 1 is completed.

The metallic fixing member 8 is brazed and attached to the substrate 1 by placing the low-melting-point brazing material 15 made of an gold-tin alloy (gold: 80 wt %, tin: 20 wt %) or the like on the metal layer deposited around the through hole 1b of the substrate 1 so as to be sandwiched between the fixing member 8 and the substrate 1, and thereafter heating them up to a temperature of approximately 300° C. to melt the low-melting-point brazing material 15. In this case, it would not happen that nickel oxide having a poor wettability to the brazing material 15 is formed on the surface of the gold plating layer 13 deposited on the metallic fixing member 8, so that the gold plating layer 13 and the brazing material 15 are considerably firmly joined to each other, and thereby the metallic fixing member 8 can be brazed and attached to the substrate 1 considerably firmly.

Next, attachment of the metallic fixing member 8 to the substrate 1 in the package for housing a photosemiconductor element of a sixth embodiment will be explained referring to FIG. 12. The sixth embodiment is similar to the foregoing embodiments and corresponding parts are denoted by the same reference characters.

At first, as shown in FIG. 5A, a nickel plating layer 12 and a gold plating layer 13 are deposited in succession on the surface of the tubular metallic fixing member 8 so that the tubular metallic fixing member 8 is brazed and attached to the substrate 1 reliably and firmly.

At step s51 of FIG. 12, the nickel plating layer 12 is an under member for firmly depositing the gold plating layer 13 to the metallic fixing member 8, and is deposited to a thickness of approximately 0.5 μm to 5 μm on the surface of the metallic fixing member 8 by the electrolytic plating method or the electroless plating method. The nickel plating layer 12 is formed by the same electrolytic plating method as the step s1 of FIG. 6.

Further, at step s52 of FIG. 12, the gold plating layer 13 has the function of enhancing the wettability of the brazing material to the metallic fixing member 8, and is deposited to a thickness of approximately 1 μm to 3 μm on the nickel plating layer 12 by the electrolytic plating method or the electroless plating method. The gold plating layer 13 is formed by the same electrolytic plating method as the step s2 of FIG. 6.

Next, at step s53 of FIG. 12, as shown in FIG. 5B, the light-transmitting member 9 is attached to the inside of the metallic fixing member 8 with glass 14 to block the inside.

The light-transmitting member 9 is attached to the metallic fixing member 8 by coating the inside of the metallic fixing member 8 with glass which has a lower melting point than the melting point of the light-transmitting member 9 and which is melted at a low temperature where the nickel plating layer 12 deposited on the surface of the metallic fixing member 8 is not diffused in the gold plating layer 13, to be specific, the low-melting-point glass 14 having a melting point of 320–400° C. which contains 50–65 wt % lead oxide, 0–10 wt % silicon oxide, 5–8 wt % boron oxide, 0–7 wt % aluminum oxide, 0–20 wt % tin oxide, 2–15 wt % titanium oxide, and 10–15 wt % lead fluoride; placing the light-transmitting member 9 on the coating low-melting-point glass 14; and thereafter heating them up to a temperature of approximately 320–400° C. in the air to melt the low-melting-point glass 14. In this case, the melting point of the glass 14 is as low as 320–400° C., so that it would not happen that a part of the nickel plating layer 12 deposited on the surface of the metallic fixing member 8 is not diffused in the gold plating layer 13 due to heat and atmosphere in glass attachment to be exposed to the surface of the gold plating layer 13, and it would not happen either that exposed nickel is oxidized to become nickel oxide. Therefore, the gold plating layer 13 can be made to have a considerably preferable wettability to the brazing material.

Here, in the case where the melting point of the glass 14 is over 400° C., part of the nickel plating layer 12 deposited on the surface of the metallic fixing member 8 is diffused in the gold plating layer 13 and exposed to the surface of the gold plating layer 13, whereas in a case where the melting point is less than 30° C., the glass 14 is softened and melted due to heat generated when the metallic fixing member 8 is brazed to the substrate 1 as mentioned later, and reliability in attachment and fixture of the light-transmitting member 9 to the metallic fixing member 8 is largely lowered. Therefore, the melting point of the glass 14 is specified in the range of 320–400° C.

Finally, the step s54 of FIG. 12, the metallic fixing member 8 is brazed and attached with a brazing material 15 to a metal layer deposited in advance around the through hole 1b of the substrate 1, whereby, as shown in FIG. 5C, brazing attachment of the metallic fixing member 8 to the substrate 1 is completed.

The metallic fixing member 8 is brazed and attached to the substrate 1 by placing the low-melting-point brazing material 15 made of an gold-tin alloy (gold: 80 wt %, tin: 20 wt %) or the like on the metal layer deposited around the through hole 1b of the substrate 1 so as to be sandwiched between the fixing member and the substrate 1, and thereafter heating them up to a temperature of approximately 300° C. to melt the low-melting-point brazing material 15. In this case, it would not happen that nickel oxide having a poor wettability to the brazing material 15 is formed on the surface of the gold plating layer 13 deposited on the metallic fixing member 8, so that the gold plating layer 13 and the brazing material 15 are considerably firmly joined to each other, and thereby the metallic fixing member 8 can be brazed and attached to the substrate 1 considerably firmly.

Here, the invention is not limited to the embodiment described above, and a variety of changes may be devised within the scope of the invention. For example, although the embodiment described above illustrates a case where the photosemiconductor element 3 excites light, the invention may be applied to a case where the photosemiconductor element 3 converts light transmitted via the optical-fiber member 11 to electric signals to take out the converted electric signals outside.

Further, although the substrate 1 explained in the embodiment described above is made of ceramics such as sintered aluminum oxide, it may be made of metallic material such as an iron-nickel-cobalt alloy.

The substrate 11 is made of ceramics. The metallic fixing member 8 is made of a gold-nickel-cobalt alloy or an iron-nickel alloy. In another embodiment of the present invention, the substrate 1 is made of a metal. The metallic fixing member 8 is made of a gold-nickel-cobalt alloy or an iron-nickel alloy.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims and therefore intended to be embraced therein.

What is claimed is:

1. A method for producing a package for housing a photosemiconductor element, the package for housing a photosemiconductor element comprising a substrate having a recess for housing the photosemiconductor element on a top surface of the substrate, a through hole being formed in a side of the substrate; a tubular metallic fixing member which is brazed to an outer surface of the substrate around the through hole, an optical fiber member being connected to one end of the tubular metallic fixing member; a light-transmitting member attached to an inside of the tubular metallic fixing member to block the inside; and a lid attached to the top surface of the substrate to close the recess, the method comprising:

(a) a first step of depositing a nickel plating layer on a surface of the tubular metallic fixing member and successively depositing a gold plating layer thereon without occurrence of diffusion of the nickel plating layer to the gold plating layer, and attaching the light-transmitting member to an inside of the metallic fixing member with glass without occurrence of damage to a surface of the light-transmitting member; and (b) a second step of brazing and attaching the metallic fixing member to the outer surface of the substrate around the through hole with a brazing material;

wherein the first step includes:

(a2) a step of depositing a nickel plating layer on a surface of the tubular metallic fixing member, and subjecting the nickel plating layer deposited on the surface of the tubular metallic fixing member, to a heat treatment in a reducing atmosphere;

(b2) a step of depositing a gold plating layer on the nickel plating layer; and (c2) a step of attaching the light-transmitting member to an inside of the metallic fixing member with glass.

2. A method for producing a package for housing a photosemiconductor element, the package for housing a photosemiconductor element comprising a substrate having a recess for housing the photosemiconductor element on a top surface of the substrate, a through hole being formed in a side of the substrate; a tubular metallic fixing member which is brazed to an outer surface of the substrate around the through hole, an optical fiber member being connected to one end of the tubular metallic fixing member; a light-transmitting member attached to an inside of the tubular metallic fixing member to block the inside; and a lid attached to the top surface of the substrate to close the recess, the method comprising:

(a) a first step of depositing a nickel plating layer on a surface of the tubular metallic fixing member and successively depositing a gold plating layer thereon without occurrence of diffusion of the nickel plating layer to the gold plating layer, and attaching the light-transmitting member to an inside of the metallic fixing member with glass without occurrence of damage to a surface of the light-transmitting member; and (b) a second step of brazing and attaching the metallic fixing member to the outer surface of the substrate around the through hole with a brazing material;

wherein the first step includes:

(a3) a step of depositing a nickel plating layer comprising 1–65 wt % cobalt and 35–99 wt % nickel on a surface of the tubular metallic fixing member and successively depositing a gold plating layer thereon; and (b3) a step of attaching the light-transmitting member to an inside of the metallic fixing member with glass.

3. A method for producing a package for housing a photosemiconductor element, the package for housing a photosemiconductor element comprising a substrate having a recess for housing the photosemiconductor element on a top surface of the substrate, a through hole being formed in a side of the substrate; a tubular metallic fixing member which is brazed to an outer surface of the substrate around the through hole, an optical fiber member being connected to one end of the tubular metallic fixing member; a light-transmitting member attached to an inside of the tubular metallic fixing member to block the inside; and a lid attached to the top surface of the substrate to close the recess, the method comprising:

(a) a first step of depositing a nickel plating layer on a surface of the tubular metallic fixing member and successively depositing a gold plating layer thereon without occurrence of diffusion of the nickel plating layer to the gold plating layer, and attaching the light-transmitting member to an inside of the metallic fixing member with glass without occurrence of damage to a surface of the light-transmitting member; and (b) a second step of brazing and attaching the metallic fixing member to the outer surface of the substrate around the through hole with a brazing material;

wherein the first step includes:

(a4) a step of depositing a nickel plating layer on a surface of the tubular metallic fixing member and successively depositing a gold plating layer thereon;

(b4) a step of attaching the light-transmitting member to an inside of the metallic fixing member with a low melting point glass having a melting point of about 320–400° C.; and (c4) a step of subjecting the metallic fixing member to a heat treatment in a reducing atmosphere at a temperature less than the melting point of the glass.

4. The method for producing a package for housing a photosemiconductor element of claims 1 or 3, wherein the reducing atmosphere is one selected from the group consisting of hydrogen atmosphere, nitrogen atmosphere and an atmosphere of a mixture of hydrogen and nitrogen.

5. The method for producing a package for housing a photosemiconductor element of claim 1, wherein the heat treatment in the reducing atmosphere is carried out at temperatures of 500–1100° C.

6. The method for producing a package for housing a photosemiconductor element of claim 3, wherein the heat treatment in the reducing atmosphere is carried out at temperatures lower than a melting point of the glass for use in attachment of the light-transmitting member.

7. A method for producing a package for housing a photosemiconductor element, the package for housing a photosemiconductor element comprising a substrate having a recess for housing the photosemiconductor element on a top surface of the substrate, a through hole being formed in a side of the substrate; a tubular metallic fixing member which is brazed to an outer surface of the substrate around the through hole, an optical fiber member being connected to one end of the tubular metallic fixing member; a light-transmitting member attached to an inside of the tubular metallic fixing member to block the inside; and a lid attached to the top surface of the substrate to close the recess, the method comprising:

(a) a first step of depositing a nickel plating layer on a surface of the tubular metallic fixing member and successively depositing a gold plating layer thereon without occurrence of diffusion of the nickel plating layer to the gold plating layer, and attaching the light-transmitting member to an inside of the metallic fixing member with glass without occurrence of damage to a surface of the light-transmitting member; and (b) a second step of brazing and attaching the metallic fixing member to the outer surface of the substrate around the through hole with a brazing material;

wherein the first step includes:

(a5) a step of attaching the light-transmitting member to an inside of the metallic fixing member with glass;

(b5) a step of coating an exposed surface of the glass with a protective film; and (c5) a step of depositing a nickel plating layer on an exposed surface of the tubular metallic fixing member and successively depositing a gold plating layer thereon.

8. The method for producing a package for housing a photosemiconductor element of claim 7, wherein the protective film is one or more selected from the group consisting of silicon oxide, magnesium fluoride and titanium oxide, and the protective film is deposited on an exposed surface of the glass by a vacuum deposition method or ion beam method.

9. A method for producing a package for housing a photosemiconductor element, the package for housing a photosemiconductor element comprising a substrate having a recess for housing the photosemiconductor element on a top surface of the substrate, a through hole being formed in a side of the substrate; a tubular metallic fixing member which is brazed to an outer surface of the substrate around the through hole, an optical fiber member being connected to one end of the tubular metallic fixing member; a light-transmitting member attached to an inside of the tubular metallic fixing member to block the inside; and a lid attached to the top surface of the substrate to close the recess; the method comprising:

(a) a first step of depositing a nickel plating layer on a surface of the tubular metallic fixing member and successively depositing a gold plating layer thereon without occurrence of diffusion of the nickel plating layer to the gold plating layer, and attaching the light-transmitting member to an inside of the metallic fixing member with glass without occurrence of damage to a surface of the light-transmitting member; and (b) a second step of brazing and attaching the metallic fixing member to the outer surface of the substrate around the through hole with a brazing material;

wherein the first step includes:

(a6) a step of depositing a nickel plating layer on a surface of the tubular metallic fixing member and successively depositing a gold plating layer thereon; and (b6) a step of attaching the light-transmitting member to an inside of the metallic fixing member with glass having a melting point of 320–400° C.

10. The method for producing a package for housing a photosemiconductor element of any one of claims 1 to 3, wherein the glass with which the light-transmitting member is attached to the inside of the metallic fixing member has a low-melting-point lower than that of the light-transmitting member.

11. A method for producing a package for housing a photosemiconductor element, the package for housing a photosemiconductor element comprising a substrate having a recess for housing the photosemiconductor element on a top surface of the substrate, a through hole being formed in a side of the substrate; a tubular metallic fixing member which is brazed to an outer surface of the substrate around the through hole, an optical fiber member being connected to one end of the tubular metallic fixing member; a light-transmitting member attached to an inside of the tubular metallic fixing member to block the inside; and a lid attached to the top surface of the substrate to close the recess, the method comprising:

(a) a first step of depositing a nickel plating layer on a surface of the tubular metallic fixing member and successively depositing a gold plating layer thereon without occurrence of diffusion of the nickel plating layer to the gold plating layer, and attaching the light-transmitting member to an inside of the metallic fixing member with glass comprises 50–65 wt % lead oxide, 0–10 wt % silicon oxide, 5–8 wt % boron oxide, 0–7 wt % aluminum oxide, 0–20 wt % tin oxide, 2–15 wt % titanium oxide and 10–15 wt % lead fluoride, and has a melting point of 320–400° C. and without occurrence of damage to a surface of the light-transmitting member; and (b) a second step of brazing and attaching the metallic fixing member to the outer surface of the substrate around the through hole with a brazing material.

12. The method for producing a package for housing a photosemiconductor element of any one of claims 1 to 3, wherein a thickness of the gold plating layer is approximately 1–3 µm.

13. The method for producing a package for housing a photosemiconductor element of any one of claims 1 to 3, wherein the substrate is made of ceramics or metal, and the metallic fixing member is made of a gold-nickel-cobalt alloy or iron-nickel alloy.

14. The method for producing a package for housing a photosemiconductor element of any one of claims 1 to 3, wherein the light-transmitting member is made of noncrystalline glass.

15. The method for producing a package for housing a photosemiconductor element of any one of claims 1 to 3, wherein a metallic flange to which the optical fiber member is fixed, is fixed to the metallic fixing member by laser welding.

16. The method for producing a package for housing a photosemiconductor element of any one of claims 1 to 3, wherein a thickness d12 of the nickel plating layer is approximately 0.5–5 µm.

* * * * *